No. 865,643. PATENTED SEPT. 10, 1907.
C. W. JACKSON.
DUST PAN.
APPLICATION FILED OCT. 31, 1906.
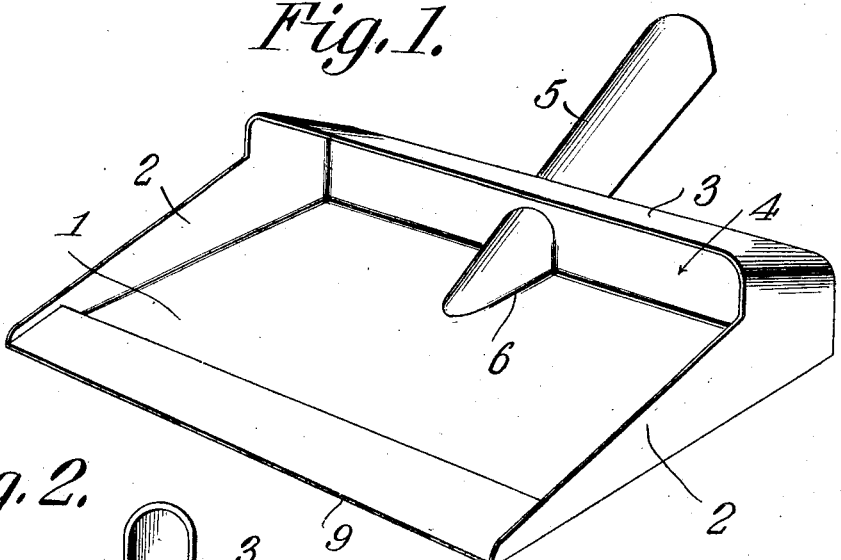
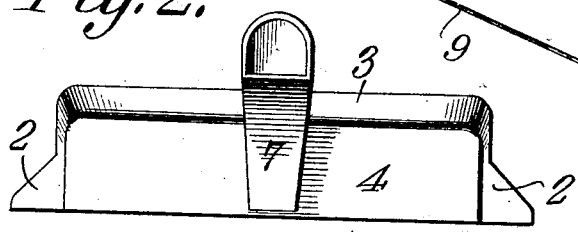
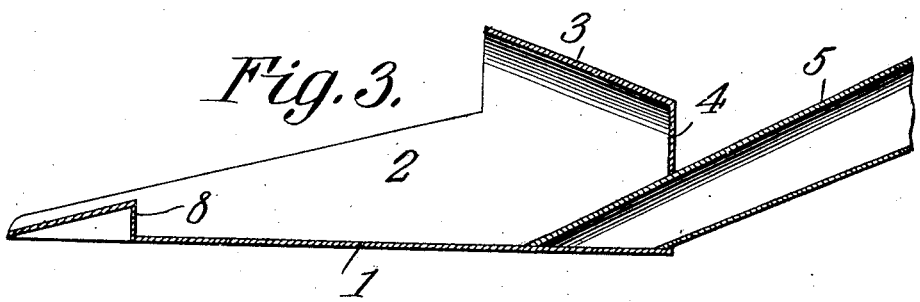
WITNESSES:
Charles W. Jackson,
INVENTOR
By C. A. Snow & Co.
ATTORNEYS

UNITED STATES PATENT OFFICE.

CHARLES WELLS JACKSON, OF ARMOUR, SOUTH DAKOTA.

DUST-PAN.

No. 865,643.　　　　Specification of Letters Patent.　　　　Patented Sept. 10, 1907.

Application filed October 31, 1906. Serial No. 341,467.

*To all whom it may concern:*

Be it known that I, CHARLES WELLS JACKSON, a citizen of the United States, residing at Armour, in the county of Douglas and State of South Dakota, have invented a new and useful Dust-Pan, of which the following is a specification.

This invention relates to dust pans and its object is to provide a simple form of device of this character the forward edge of which will lie flat upon a floor or other surface and has means for preventing dust, etc., from sliding out of the pan after it has once been swept thereinto.

Another object is to simplify the construction of devices of this character and to provide means to prevent dust, etc., from being brushed under the pan after the same has been placed in position.

With these and other objects in view the invention consists of certain novel features of constructions and combinations of parts which will be hereinafter more fully described and pointed out in the claims.

In the accompanying drawings is shown the preferred form of the invention.

In said drawings: Figure 1 is a perspective view of a dust pan constructed in accordance with the present invention; Fig. 2 is a rear elevation thereof; and Fig. 3 is a central longitudinal section.

Referring to the figures by characters of reference, 1 is the bottom of the pan the same being provided with upturned sides 2 connected at their rear ends by a top strip 3 which, with the back 4, forms a hood over the rear portion of the pan. A tubular handle 5 is inclined upwardly from the bottom 1 and through the back 4 of the pan, the lower or forward end of the handle being beveled as shown at 6 so as to rest flat upon the bottom of the pan. It will also be noted by referring to Figs. 1 and 2 that the handle 5 has a flat lower face 7 and that the sides of said handle are parallel. As a result of this arrangement said sides are disposed at right angles to the bottom of the pan and therefore no dirt retaining pockets or recesses are formed within the pan at the sides of the handle as would be the case should the handle be circular in cross section. A dust retaining shoulder 8 is formed along the bottom 1 of the pan by bending the bottom upward as shown particularly in Fig. 3 and then inclining it downward so that its edge will be in alinement with the front ends of the lower edges of sides 2. The space in front of the shoulder 8 is closed at its ends, however, by the sides 2 and said sides by closing the ends of the space constitute guards to prevent dust, etc., from being swept under the front portion of the pan.

In using this pan the same is placed upon the floor and the front edge 9 thereof will rest smoothly thereon as will also the lower edges of the sides 2. Dirt may then be swept over the raised portion of the bottom 1 of the shoulder 8 and into the pan and the sides 2 prevent any part of the dirt from passing under the pan and in front of the shoulder 8 as would be the case if said sides should not extend across the ends of said space.

It will be seen that the pan is very simple, durable and inexpensive in construction and dirt can not only be easily swept thereinto but will also be retained therein should the pan be slightly tilted forward.

What is claimed is:

A dust pan consisting of a bottom, and side and rear end walls, a hood extending from said walls over the rear portion of the bottom, and a handle extending through the rear wall of the pan and secured upon the bottom adjacent thereto, said handle having a flat lower face and parallel side portions, said side portions being disposed perpendicularly to the bottom of the pan.

In testimony that I claim the foregoing as my own, I have hereto affixed my signature in the presence of two witnesses.

CHARLES WELLS JACKSON.

Witnesses:
　CHAS. S. ROBINSON,
　CHARLES M. KAUFMAN.